(12) United States Patent
Armistead

(10) Patent No.: US 8,136,261 B2
(45) Date of Patent: Mar. 20, 2012

(54) INSTANT READING OIL DIPSTICK IMPROVEMENTS

(76) Inventor: John Anderson Armistead, Easley, SC (US)

( * ) Notice: Subject to any disclaimer, the term of this patent is extended or adjusted under 35 U.S.C. 154(b) by 0 days.

(21) Appl. No.: 12/925,527

(22) Filed: Oct. 25, 2010

(65) Prior Publication Data

US 2011/0061254 A1 Mar. 17, 2011

Related U.S. Application Data

(63) Continuation-in-part of application No. 12/288,399, filed on Oct. 21, 2008.

(51) Int. Cl.
*G01F 23/04* (2006.01)

(52) U.S. Cl. ........... 33/727; 33/722; 33/729; 73/864.63; 73/864.64

(58) Field of Classification Search .................... 33/722, 33/725, 727, 729; 73/864.63, 864.64
See application file for complete search history.

(56) References Cited

U.S. PATENT DOCUMENTS

| | | | | |
|---|---|---|---|---|
| 2,176,618 A * | 10/1939 | Wilson | ............................. | 356/70 |
| 2,279,111 A * | 4/1942 | De Witt | ........................ | 15/220.4 |
| 2,660,058 A * | 11/1953 | Vogt | ............................. | 73/290 R |
| 2,756,716 A * | 7/1956 | Petrossian | ........................ | 356/70 |
| 2,782,514 A * | 2/1957 | Scott et al. | ....................... | 33/717 |
| 2,855,682 A * | 10/1958 | Norgard | .......................... | 33/725 |
| 3,316,647 A * | 5/1967 | Swallert | ......................... | 33/722 |
| 3,594,906 A * | 7/1971 | Kerfoot | ...................... | 73/864.64 |
| 3,662,470 A * | 5/1972 | Sasgen | ............................ | 33/731 |
| 3,703,038 A * | 11/1972 | Smith | .............................. | 33/725 |
| 4,110,909 A * | 9/1978 | Mayr et al. | ...................... | 33/725 |
| 7,360,319 B1 * | 4/2008 | Goldstein et al. | ............... | 33/725 |
| 2010/0095547 A1 * | 4/2010 | Armistead | ....................... | 33/722 |

* cited by examiner

*Primary Examiner* — Christopher Fulton

(57) ABSTRACT

Instant Reading Oil Dipstick Improvements is a near universal design with most assembly done by the manufacturer. The customers can easily adapt such to match their existing dipstick geometry by pushing the adjustable parts to the correct location, where they will remain. The air valve is within a single, machined brass cone that adapts to the metal tube and seals in the engine vacuum. A new tubular plastic air seal around the wire handle increases reliability. And a cone shaped rubber squeegee will automatically remove oil from the outside of the tubing as the dipstick is withdrawn from the crankcase.

8 Claims, 1 Drawing Sheet

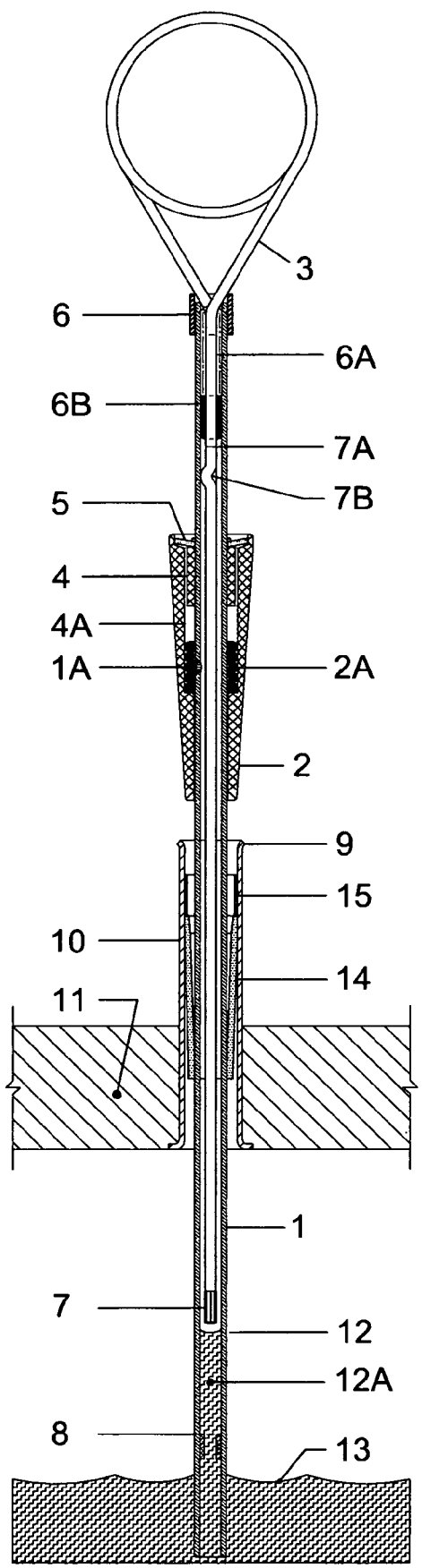

INSTANT READING OIL DIPSTICK IMPROVEMENTS

"This is a continuation in part of utility application Ser. No. 12/288,399, filed Oct. 21, 2008." Such prior application was named INSTANT READING OIL DIPSTICK. It is intended that the present application include the collective product development that will be embodied in the first commercial introduction of the product. Therefore, the present application will describe the total invention as presently developed, including the salient earlier claims that are still applicable.

BACKGROUND OF THE INVENTION

The objective of both the prior Instant Reading Oil Dipstick invention, and the present Improvements invention, is to make reading vehicle oil levels as quick and easy as possible. Experience has shown that new oil, in particular, can be difficult to see, especially under poor light conditions. And the oil level using conventional metal dipsticks can't be read without wiping off, reinserting and withdrawing the dipstick one or more times to see where the film of oil comes to on such dipstick type.

The Improvements—as in the present patent application—are manifested in a near universal dipstick design that can easily be customer-adjusted to match their existing dipstick geometry. The disparate features relating to increasing this product's marketability and utility are described below.

BRIEF SUMMARY OF THE INVENTION

The oil level in internal combustion engines can be read, conventionally, by observing the location of a coating of oil on a thin metal strip that has ADD and FULL indication markings on the lower end. To do so, residual oil must first be wiped off of the metal strip with a tissue or rag before reinserting and withdrawing the dipstick—sometimes more than once—in order to know the true oil level.

The prior Instant Reading Oil Dipstick invention speeds up and simplifies the oil level determination process by extracting, in one step, a representative slug of oil inside of a clear fluoroplastic tube. That is possible because of an air valve located near the top of the tube which closes automatically as soon as the dipstick is pulled outward.

Most of the present Improvements to the prior invention are for making the design more universally adaptable to the varied vehicles and engine designs that are in the marketplace. Dipsticks tend to vary: in their length; the spacing between the ADD and FULL indications; the diameter of the primary metal tube portion; the upper diameter of the sometimes flared top end of the metal tubes; and the mode of creating an airtight seal into the engine crankcase.

The present invention uses a bigger and longer tapered brass cone for enclosing the required air valve. The friction between the cone and the metal tube of the engine makes an airtight seal for maintaining engine vacuum. And the bigger size allows one cone design to function on a more diverse range of vehicle engines. Such cone has a single, bonded, brass tube stop located inside—as opposed to having two separate stops above and below the valve that must each be bonded to the tubing. The latter arrangement is more compact as well as more appealing.

The former invention varied the installed length of the fluoroplastic tube by varying the location of the drilled air vent. Intended for sale in kit form, the prior invention required the customer to precisely locate and drill the vent hole; and required the customer to accurately glue the two stops. The present invention standardizes the location of both the vent hole and the glued stop such that no drilling or gluing operations are required by the customers.

To adjust the dipstick length with respect to the FULL mark, the wire handle/tubing-stiffener is now made in two separate pieces which overlap near the top. A simple crimp near the top of the long stiffener wire indents the plastic tubing, sufficiently, that such wire will stay in the position determined by the customer which correlates to the existing dipstick. That length adjustment is made by inserting a small wooden dowel or piece of wire into the lower end of the plastic tubing and carefully pushing the stiffener wire up to the required FULL location. The ADD line is a small section of fluoroplastic tubing, inserted into the lower end by the customer and pushed up to the location that corresponds to the existing metal dipstick. The excess length of tubing in the dipstick, if any, may be cut off by the customer using a utility knife.

A new feature of importance is the inclusion of a small tubular plastic air seal around the top-most wire of the handle. The Option One instant glue to be used to bond the handles to the tubing can be brittle, and thus not reliably airtight. The strong capillary attraction of that glue type to metal wires can cause an excess of glue to flow into the tubing—which will now be stopped from doing so by the tubular plastic seals. The Option Two mechanical attachment will use no glue, but instead will be facilitated by the insertion of a small metal ball bearing inside the tubing, beneath where the top bushing is located. Such ball bearing will hold the wire handle in place by the wedging action of the bearing against an offset in the wire handle. In the latter construct type, 100% of the air tightness will be from the tight fit of a lower portion of the same wire within the two concentric plastic tubes.

Though the oil level is read through the clear plastic tubing, a film of oil would still adhere to the outside of the tubing, as in the prior invention. In some cases the outside oil film partially rubs off at the top of the metal tubing, reducing the grip needed to actuate the air valve when the dipstick is withdrawn. In order to clean oil from the outside of the plastic tube, a cone-shaped rubber squeegee, if so required, can be held in place by a split-cylinder metal spring clip that can be fitted inside the metal tube, just below the flared tubing portion, if any. The lower I. D. of the cone is smaller than the plastic tubing O. D., and automatically removes outside oil from such as the dipstick is being withdrawn. The larger I. D. of the upper squeegee portion allows the easy reinsertion of the dipstick after taking the oil level reading. In addition, the binding fit of the brass slide valve will be increased by having a fine spiral groove along the entire outside of the cone that will increase the grip, even if some loose oil gets onto the upper lip of the metal dipstick tube on vehicles.

BRIEF DESCRIPTION OF THE VIEW OF THE DRAWING

Typically, dipsticks are about two feet long. The single Sectional View drawing which embodies the Instant Reading Oil Dipstick Improvements has correct proportions except that the tubing length is truncated or shortened. The salient features of the dipstick are shown in a longitudinal cut through the diameter of the cylindrical tubes and valve parts. Also, the oil dipstick is shown as a straight part. In actuality, most metal dipstick tubes are curved. The tempered, stainless steel wire inside the plastic tube allows the assembly to bend, easily, to conform to the curvature of most metal dipstick tubes. But the Instant Reading Oil Dipstick will return to straightness when it is withdrawn, as for measuring the oil level.

DETAILED DESCRIPTION OF THE INVENTION

The level of engine oil, 13, inside of a crankcase, 11, can be read by inserting a clear fluoroplastic tube, 1, through metal dipstick tube, 10, and into the oil, 13. Upon lifting the wire handle, 3, which has been made airtight to the tubing, 1, via a short, concentric section of plastic tubing, 6B, the air valve inside of brass cone, 2, closes over vent hole 1A. Brass tubing trim, 6, reinforces the mechanical connection and/or helps to maintain the integrity of glue, 6A. With the air unable to escape the tube, 1, through the vent hole 1A, because of the five O-rings, 2A, two above and two below vent hole, 1A, a slug of oil, 12A, between FULL line, 7, and ADD line, 8, can be extracted from crankcase, 11, giving a true indication of the level of oil, 13, inside of crankcase, 11.

The air valve inside of brass cone, 2, has a free up and down motion of 3/16", which corresponds to the distance between the centerline of the vent hole, 1A, and the center O-ring of 2A, when the air valve is in the OPEN position. The air valve inside 2 must be open the entire time that the brass cone is inserted into metal tube, 10, so that the oil, 13, can flow into or out of the tubing, 1. Free flow of air to vent hole, 1A, is made possible by having the I. D. of brass part, 2, be larger than the O. D. of the fluoroplastic tubing, 1. And the molded rubber squeegee part, 14, has four longitudinal grooves to vent the air from within crankcase, 11, up to vent hole, 1A.

The vertical motion of the air valve is limited by an internal brass tubing section, 4, which is securely bonded to the fluoroplastic tubing, 1. The downward motion of the brass cone, 2, corresponding to the valve CLOSED position, as in the drawing, is limited by stock part, 5, which is a star-shaped, stop washer which bites into the upper I. D. of the brass cone, 2. The upward motion of the brass cone, 2—which is initiated by the insertion pressure between the outer cone of 2 and the upper edge, 9, of metal tube, 10—is limited by having the O-rings, 2A, abut the brass stop, 4. The valve inside of brass cone, 2, will close as soon as the handle, 3, has been lifted 1/16", or the thickness of one O-ring of 2A.

The present dipstick invention is intended to be customer adapted to match the geometry of their existing dipsticks. The relative location of the FULL indicator, 7, which is painted red, can be customer adjusted by inserting a small wooden dowel or metal wire into the lower end of tubing, 1, and pushing the wire, 7A, up so that FULL indicator, 7, is in the correct position. Wire, 7A, will be retained in the desired position via a crimp, 7B, in that same wire. The crimp, 7B, will indent the wall of fluoroplastic tubing, 1, and resist having the wire, 7A, fall out by its own weight. The ADD indicator consists of a smaller section of fluoroplastic tubing, 8, that can be retained by friction within the I. D. of fluoroplastic tubing, 1, and is placed in the correct position by pushing with a small wooden dowel or wire.

Because the oil of 13 will coat the outside of tubing, 1, a cone-shaped molded rubber squeegee, 14, is positioned inside of metal tubing, 10, below any flared portion thereof, if apt. Because the lower I. D. of the squeegee, 14, is smaller than the O. D. of the fluoroplastic tubing, 1, any oil coating the outside of such tubing, 1, will be wiped off, automatically, upon removing the dipstick from the metal dipstick tube, 10. A small, split, stainless steel, cylindrical spring clip, 15, will retain the rubber squeegee, 14, in place by resisting the tendency of the rubber squeegee, 14, to move upward because of the friction between the fluoroplastic tubing, 1, and the lower I. D. of the rubber squeegee, 14. Any excess length of fluoroplastic tubing, 1, can be trimmed off by the customer using a utility knife.

Friction between the metal dipstick tubing, 9, and the cone surface, 2, will be increased by having a fine spiraling groove over the entire surface of cone, 2. The resulting textured surface will increase the bind of the cone, 2, inside of the metal dipstick tubing, 9, such that sufficient friction to actuate the valve will be present even if some loose oil gets onto lip, 9. In such cases, the squeegee, 14, and split cylinder spring clip, 15, may not be needed for proper function of the slide valve.

The invention claimed is:

1. An instant reading automotive oil dipstick assembly having a slide-actuated air valve which vents or seals a translucent fluoroplastic tubing that is located within a machined brass cone that adapts to the engine's metal dipstick tubing size, and seals in the engine vacuum airtight, facilitated by having a short, cylindrical plastic tubing section of a soft formulation receive one end of a looped wire handle, and by being compressed against the fluoroplastic tubing wall, forms a dependable air seal, as well as stops the flow of cyanoacrylate gel glue that would have tended to flow too freely down into the fluoroplastic tubing, with such assembly allowing the easy reading of the oil level by automatically extracting a representative slug of oil when the dipstick is lifted out.

2. An instant reading automotive dipstick assembly, as in claim 1, with the slide actuated air valve having five O-rings, two above and two below the vent hole, including one central O-ring that is used only as a spacer, and allowing maximum sealing efficiency.

3. An instant reading automotive dipstick assembly, as in claim 1, with the slide actuated air valve being constrained in its total up and down motion by a single, internal, machined brass bushing bonded to the fluoroplastic tubing which will contain the representative slug of oil to be extracted.

4. An instant reading automotive dipstick, as in claim 1, having a tempered wire stiffener inside of the fluoroplastic tubing which is a separate piece of wire from the looped wire handle and will allow the tempered wire stiffener to be adjusted, vertically, and held in the selected position by a crimp in the upper wire portion of such stiffener wire that indents and grips the fluoroplastic tubing so as to be retained in the selected position, and allows the bottom end of such stiffener wire to be the FULL indicator, which also can have a painted marking on the end for increasing the visibility of the FULL indicator.

5. An instant reading automotive dipstick, as in claim 1, that has a short, smaller O. D. section of fluoroplastic tubing inserted within the main fluoroplastic tubing section that will allow the former to be adjusted in position to serve as the ADD line for the dipstick.

6. An instant reading automotive oil dipstick assembly, as in claim 1, that has a cone-shaped, molded rubber squeegee, member having four, shallow, longitudinal groves on the outside that allow free air flow from a vehicle's crankcase to the slide-actuated air valve, and which can be located inside of the metal dipstick tube with the function of removing oil from the outside of the translucent fluoroplastic tubing as the dipstick is withdrawn.

7. An instant reading automotive oil dipstick assembly, as in claim 6, that has a split, cylindrical, stainless steel spring clip that is retained inside of the metal dipstick tube of vehicles by friction and keeps the cone-shaped, molded rubber squeegee in place, by being positioned above such.

8. An instant reading automotive oil dipstick assembly, as in claim 1, facilitated by the cone-shaped brass slide valve forming a frictional bond with the metal dipstick tube of a vehicle, that will allow the valve to close over the small vent hole through the wall of the translucent fluoroplastic tubing as soon as the wire handle is lifted, creating a vacuum inside such tubing that-will-extracts a representative slug of oil from the crankcase when the dipstick is lifted out.

\* \* \* \* \*